United States Patent [19]

Weber

[11] Patent Number: 4,547,341
[45] Date of Patent: Oct. 15, 1985

[54] CYCLONE SUPPORT SYSTEM

[75] Inventor: P. Stan Weber, Baytown, Tex.

[73] Assignee: Exxon Research and Engineering Co., Florham Park, N.J.

[21] Appl. No.: 559,326

[22] Filed: Dec. 8, 1983

[51] Int. Cl.[4] .................. B01D 45/12; B01J 8/24; F27B 15/08
[52] U.S. Cl. .................. 422/147; 55/345; 55/346; 55/349; 248/317; 248/324; 248/DIG. 1; 422/144; 422/145
[58] Field of Search .................. 422/144, 145, 147; 55/343, 345–349, 459 R; 248/317, 324, DIG. 1; 165/83

[56] References Cited

U.S. PATENT DOCUMENTS

| | | | |
|---|---|---|---|
| 2,728,642 | 12/1955 | Cunningham et al. | 23/288 |
| 2,838,382 | 6/1958 | Ringgenberg | 422/147 |
| 3,333,402 | 8/1967 | Kalen | 55/345 |
| 3,563,911 | 2/1971 | Pfeiffer et al. | 422/144 |
| 3,850,231 | 11/1974 | Creek | 165/83 |
| 3,955,950 | 5/1976 | Miller, Jr. | 55/459 |
| 3,982,902 | 9/1976 | Lortz | 23/288 |
| 4,273,565 | 6/1981 | Worley | 55/343 |
| 4,431,049 | 2/1984 | Zamma et al. | 165/83 |

FOREIGN PATENT DOCUMENTS 366849 2/1932 United Kingdom .................. 165/83

Primary Examiner—Barry S. Richman
Assistant Examiner—William R. Johnson
Attorney, Agent, or Firm—Donald F. Wohlers

[57] ABSTRACT

A novel arrangement of cyclone and plenum assembly and support therefor wherein the plenum is a totally separate vessel and is suspended from the main vessel shell on pinned connectors to thereby provide for unrestrained vertical and horizontal movement. In turn, the cyclone weight or load is supported directly from the outer periphery of the plenum chamber in a manner to allow direct load transfer from the heavy cyclones directly upward through the brackets and pinned connectors to the main vessel shell. This arrangement which is in effect a floating plenum and cyclone combination, is connected to the vessel outlet line with a flexible bellows connection providing the necessary seal between the main vessel and the plenum. The use of relatively short radial bracket members on the outer periphery of the plenum chamber, to which the pivoted support links are connected, minimizes the length of the support beam to which the combined load of the cyclones and the plenum is applied.

11 Claims, 5 Drawing Figures

CYCLONE SUPPORT SYSTEM

BACKGROUND OF THE INVENTION

The present invention relates to improved means for supporting large masses such as cyclones and plenum chambers within a vessel which is subjected to relatively high temperature differentials which cause both vertical and horizontal thermal expansions. In particular, certain pressure vessels in petroleum refineries, such as in a reactor or a regenerator of a catalytic cracker, contain plenum chambers connected to centrifugal separators (i.e. cyclones) to separate the solid catalyst particles from gases flowing upwardly within the vessel. In most of these cases, numerous cyclones are employed usually arranged in two concentric rings of cyclones wherein a ring of primary cyclones is connected in series with a ring of secondary cyclones. Dirty gases enter the primary cyclone ring from the pressure within the vessel, pass through the two cyclones in series and the cleaned gases discharge from the secondary cyclone outlet into a collector or plenum chamber. This collector or plenum is contained within the main vessel and in the prior art, such as in U.S. Pat. No. 4,273,565, it has been conventional to have its upper surface provided by the vessel head. Typically, the plenum chambers and cyclones operate at elevated temperatures of between 1200° F. and 1800° F. These elevated temperatures require the vessel to be internally insulated and also require the use of high alloy steels for the fabrication of the plenum and cyclones, but even then, allowable stresses in the steel components are very low, requiring efficient load transfer to prevent failure of the steel components. Additionally, large differential movements result, sometimes as much as three to four inches between the hot inner parts within the vessel and the relatively cold internally insulated outer shell. Because these process vessels also usually operate at elevated pressure, they require careful design to retain a pressure seal between the inlet and outlet sides of the cyclone system and between the cyclone system and the plenum chamber.

Typical of the aforementioned described prior art arrangements are illustrated in U.S. Pat. No. 4,273,565, and U.S. Pat. No. 2,728,642. In systems of this type illustrated by these representative prior art patents, the large expansion rate of the alloy steels used in the components at elevated temperatures results in significant differential horizontal (radial) and vertical expansions between the hot internal cyclone and plenum parts and the colder vessel shell to which these parts are directly secured. Support of the cyclone system is further complicated by the movement of the plenum relative to the vessel shell when these cyclones are fixedly supported from the cold shell relative to the moving hot plenum members. Since the plenum must be totally isolated from the cyclone inlet side of the vessel to prevent flow bypassing around the cyclones, a rigid connection from the plenum to the shell is required. However, such connection is subject to stress because of the differential thermal expansion rates of all these rigidly connected parts, and accordingly failure due to stress concentrations is sometimes experienced. This occasional failure can be appreciated since typically the total weight of the cyclone system within a catalytic cracker vessel is several times the weight of the associated plenum and may be as much as 400 tons total weight. The problem of load transfer of this suspended mass to the main vessel shell is particularly critical at the elevated temperatures encountered within the operating environment which severely reduces the permissible stress on the high alloy steels employed.

SUMMARY OF THE INVENTION

To overcome the foregoing drawbacks of typical prior art arrangements, it has been suggested by others such as in U.S. Pat. Nos. 3,955,950, 3,333,402 and 3,982,902, to support all or part of the cyclone load from pivotal support means attached to the insulated outer shell. These arrangements, in part, reduce some of the aforesaid described differential thermal stress problems encountered in earlier patents but, at the same time, did not completely eliminate the differential thermal stress problems associated with fixing portions of the cyclone system to a fixed plenum chamber directly secured to the shell. In addition, while pivotal supports for cyclones are suggested as in U.S. Pat. No. 3,982,902, such pivotal support was through a large horizontal beam which was subjected to large bending stresses. In contrast thereto, applicant's arrangement and solution to the problems of the prior art has been to construct the plenum chamber as a totally separate vessel and to suspend it from the main vessel shell on pinned connectors to thereby provide for unrestrained vertical and horizontal movement. In turn, the cyclone weight or load is supported directly from the outer periphery of the plenum chamber in a manner to allow direct load transfer from the heavy cyclones directly upward through the brackets and pinned connectors to the main vessel shell. This arrangement which is in effect a floating plenum and cyclone combination, is connected to the vessel outlet line with a flexible bellows connection providing the necessary seal between the main vessel and the plenum. The use of relatively short radial bracket members on the outer periphery of the plenum chamber, to which the pivoted support links are connected, minimizes the length of the support beam to which the combined load of the cyclones and the plenum is applied. In this way, applicant's arrangement is such that essentially all of the internal load of the plenum and cyclones are carried in tension to the vessel shell through the pivoted support links, and such load is transmitted through a single vertical path to the shell. Furthermore, because the combined supported load of the plenum and the cyclone system is balanced on either side of the short beam brackets attached to the plenum periphery and the radial length of the brackets is kept relatively short, the bending moment in such brackets is kept to a minimum and the brackets need not be of unduly large cross-section to support high bending loads.

Accordingly, it is a primary object of the invention to provide an improved cyclone and floating plenum support system for a reactor vessel which includes a plurality of short radial brackets affixed to the outer periphery of the plenum wherein the brackets are located substantially vertically above each of the primary cyclones and wherein the secondary cyclones form an inner concentric ring of cyclones disposed radially inward from the primary cyclones, to substantially balance in combination with the weight of the plenum, the load imposed upon the brackets to reduce the bending stresses in the support system and to thereby transmit the combined load of the plenum and cyclones to the shell of the vessel primarily in tension through a plurality of pivoted link means attached to said brackets.

A further object of the present invention is to provide a support system for a plurality of cyclones connected to a floating and suspended plenum chamber within a vessel wherein a portion of the load of the suspended members is carried by means external of the vessel through load support springs attached to an external frame exterior of said vessel.

It is a still further object of the invention to provide an improved cyclone support system wherein thermally induced stresses are minimized and wherein most of the supported load of the cyclones and plenum system is transmitted to the vessel shell in tension through a plurality of generally vertical and pivoted support links.

A further object of the invention is to provide a support system for a combined cyclone plenum chamber load wherein the plenum chamber and cyclones are free to float vertically and horizontally without imparting thermally induced stresses to the vessel.

A still further object of the invention is to provide a suspension system for a cyclone plenum chamber system within a reactor vessel wherein part of the weight of the plenum is supported from means external of the vessel shell.

Another and still further object of the invention is to provide a cyclone support system which is simple in design, economical to manufacture, and trouble-free in operation.

These and other objects and advantages of the invention will become apparent and the invention will be more fully understood from the following description and drawings in which.

Figure 1:
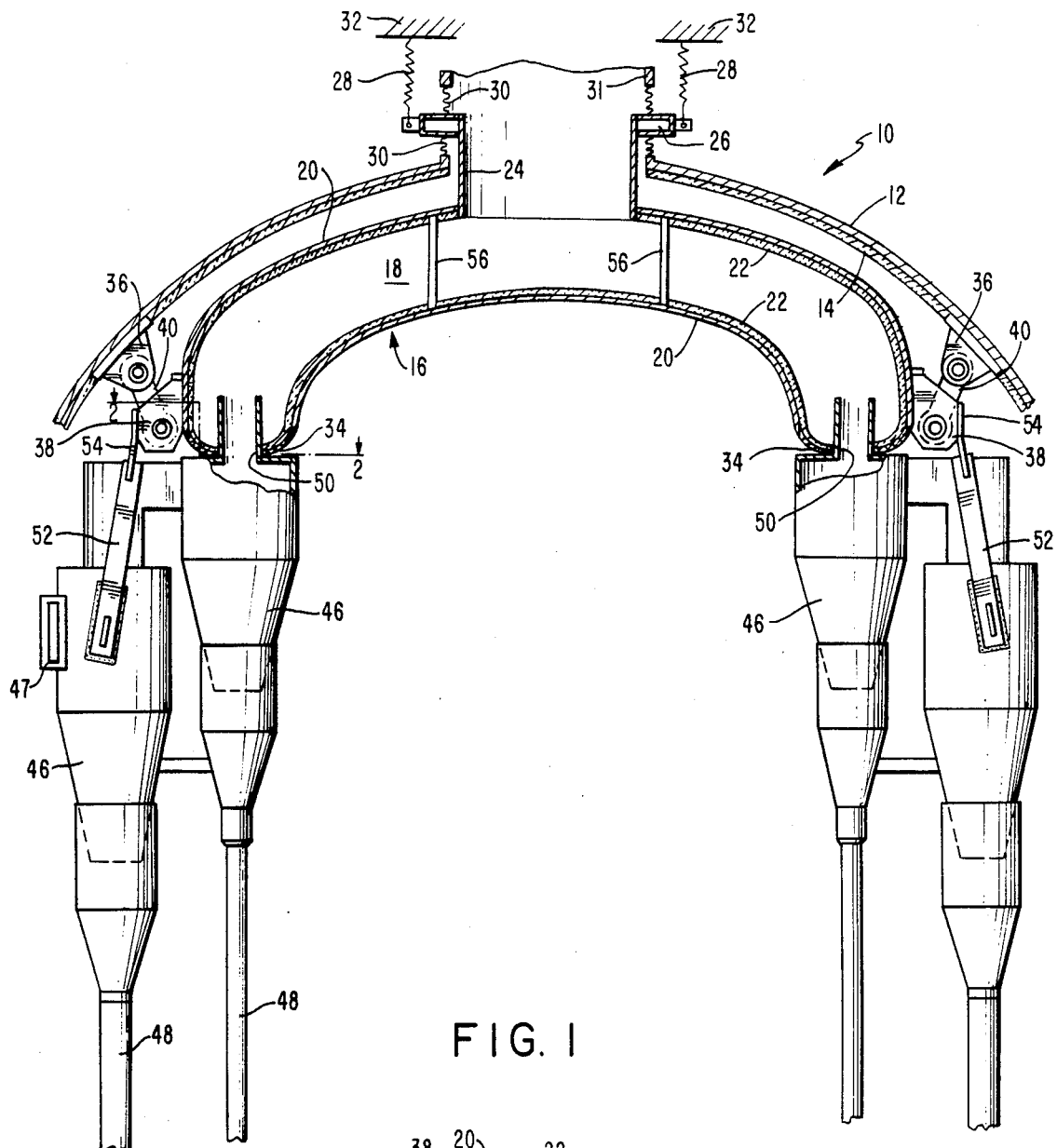
FIG. 1 is a fragmentary side elevation view partially in cross-section of the invention as applied to the interior of an insulated reactor vessel.
Figure 2:
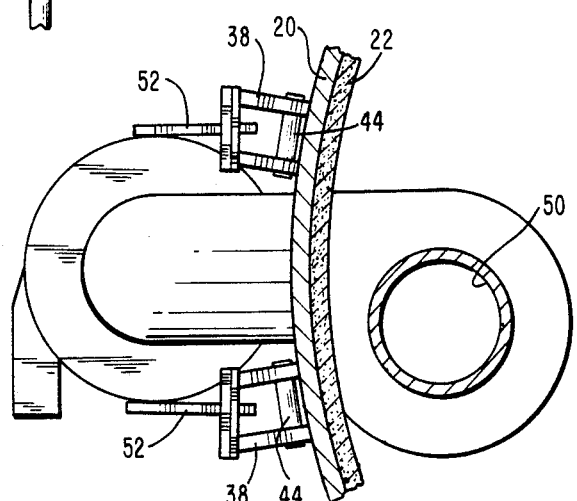
FIG. 2 is a fragmentary top view of the primary and secondary cyclones taken along line 2—2 of FIG. 1.

It will be understood that the Figures illustrate only a preferred embodiment of the invention and that other embodiments are contemplated within the scope of the claims hereinafter set forth.

DETAILED DESCRIPTION OF THE INVENTION

Referring to the Figures, a pressure vessel member 10 such as a fluidized bed catalytic cracker regenerator vessel or a reactor vessel is shown, including an outer shell 12 suitably protected by an internal refractory insulation lining 14. The vessel 10 includes an internal plenum assembly 16 defining an internal plenum chamber 18. The plenum chamber 18 includes an outer metallic sheet 20 which is lined with a suitable refractory erosion resistant material 22. The upper portion of the plenum chamber exits into an outlet conduit 24 extending upwardly through a passageway in the wall of the shell 12 to terminate in an annular support ring designated 26. Attached exteriorly to the annular support ring 26 are a plurality of load carrying support springs 28 fixed to an external frame support shown schematically at 32. Leakage of vessel gases is prevented by the provision of expansion bellows 30 extending between the shell 12 and the support ring 26 and between the support ring 26 upwardly to the downstream outlet conduit 31. The provision of load carrying springs 28 to provide support to suspend part of the load of the cyclones and plenum is desirable when there is a large central axis load on the plenum which might be present if a third innermost ring (not shown) of cyclones were employed.

Figures 3, 4:
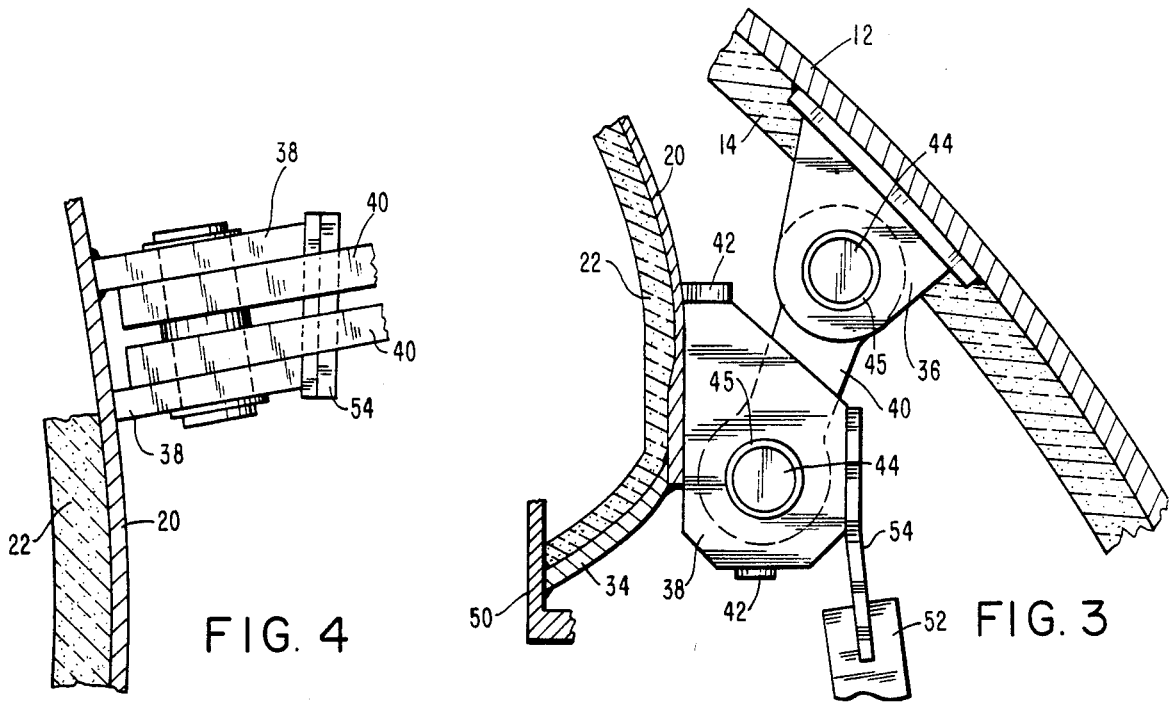
FIG. 3 is an enlarged fragmentary view showing a typical support link suspending the outer periphery of the plenum chamber to the vessel shell.
FIG. 4 is a top plan view of a typical support bracket as attached to the plenum periphery.
Figure 5:
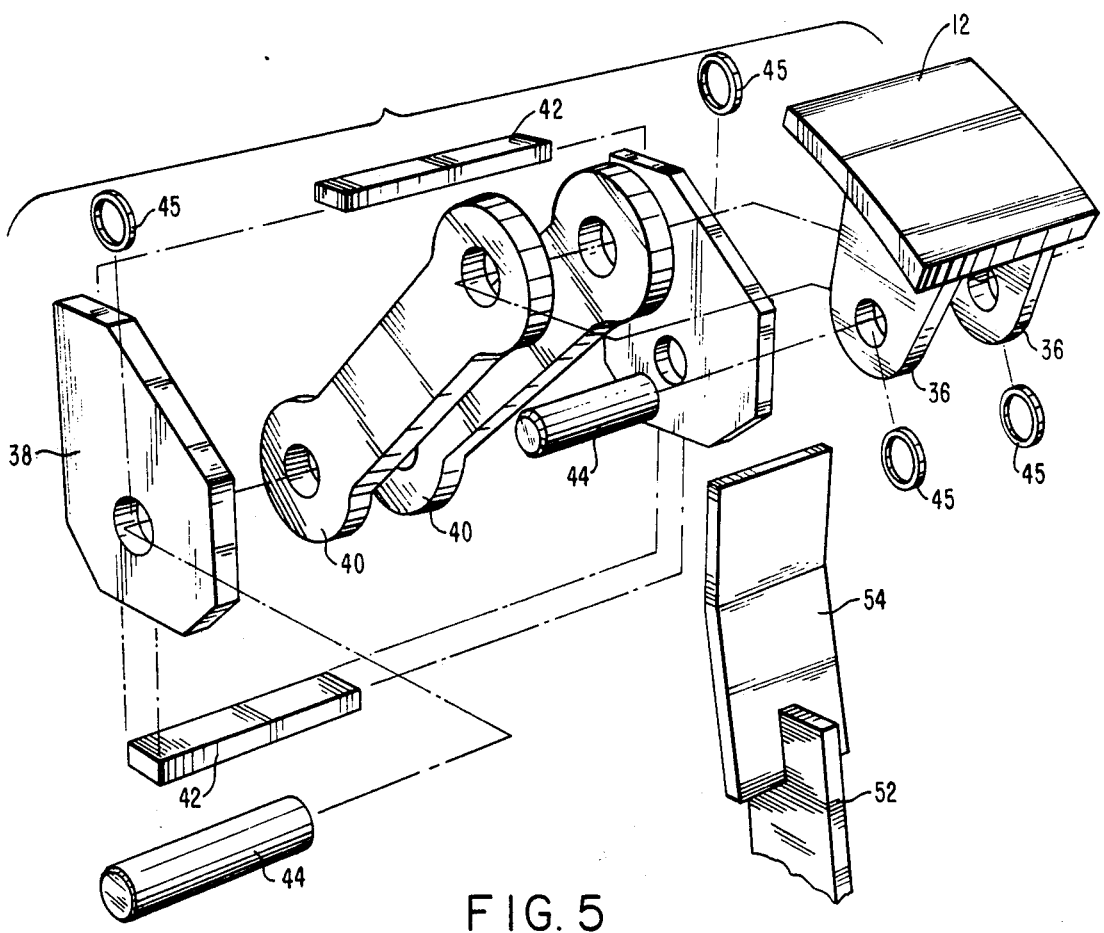
FIG. 5 is an exploded perspective view of a typical bracket and support link for the cyclone separator suspension system.

Located about the periphery of the plenum are a plurality of brackets or lugs 38 (see FIGS. 3, 4 and 5). Each pair of brackets 38 includes a pivot pin 44 which pivotally engages a pair of support links 40 which extend substantially vertically upwardly to attach through another pivot pin 44 to a pair of corresponding shell support brackets 36. The brackets 38 on the plenum periphery are provided with upper and lower stiffening bars 42 which are suitably welded to the brackets, which are in turn welded to the plenum periphery. The upper and lower pivot pins 44 are suitably secured and prevented from axial movement by washers 45 which may be welded to the ends thereof exterior of the bracket pairs 38 and 36.

Suspended from each of the bracket pairs 38 in a circular ring extending around the cylindrical interior of the reactor vessel 10 are a plurality of primary cyclone assemblies designated 46. These cyclones in the outer ring of cyclone assemblies comprise the primary cyclones whereas the inner ring of cyclone assemblies 46 constitute the secondary cyclones which are adapted to receive the gaseous discharge from the primary cyclones. The inlet to each individual primary cyclone is through a passageway designated 47 while the solids discharge from each of the cyclones is downwardly through conventional solids discharge legs 48. Support of the outer concentric ring of cyclones from the brackets 38 is provided by a plurality of essentially vertical pairs of hanger straps 52, the lower end of which is suitably welded to opposite sides of each one of the primary cyclones. The upper end of each support strap 52 includes an attachment plate 54 which is welded into a slot at the upper end of strap 52 at right angles thereto, and in turn welded across the outer edge of the brackets 38. Each of the secondary cyclones 46 included in the inner ring of cyclone assemblies includes a gaseous discharge conduit 50 which extends upwardly through a suitable aperture in a concave bottom wall portion 34 of the plenum 16 and is weldably attached thereto. The concave configuration of the annular ring portion 34 imparts added strength thereto for supporting the mass or load of the inner ring of cyclones 46 from the plenum chamber. The interior of the plenum chamber 18 is also provided with auxiliary stiffening or vertical support bars 56 suitably attached to the plenum heads. The exterior of the plenum heads adjacent the upper and lower ends of the bars 56 may be provided with stiffening rings (not shown) if required.

With the foregoing structural arrangement in mind, it will be seen that the horizontal width of the brackets or lugs 38 has been kept purposely short so that a minimum of bending therein is imparted by the suspended load. This suspended load is primarily the mass of the combined inner and outer cyclone rings 46—46 and the mass of the plenum assembly 16. As mentioned earlier, typically the weight of this combined mass can and does sometimes exceed 400 tons in a typical fluidized bed catalytic cracker and, as such, can present difficult structural suspension and support design problems which are particularly aggravated by the high elevated temperatures at which these internal parts must operate. Additionally, large differential thermal expansions will exist between the internal members within the reactor shell and the shell itself which is necessarily insulated by refractory 14 from the high internal temperatures within the reactor.

Accordingly, with the aforementioned optimized arrangement of parts in applicant's support system, the short length of the brackets 38 and the balancing of the suspended load of the primary cyclones in the outermost concentric ring, with the weight of the secondary cyclones on the opposite side of the pivotal support of the brackets, allows minimum bending stresses. In addition, in those instances where it is desired, part of the load of the plenum may be transferred externally of the reactor shell 12 through the arrangement of the annular support ring 26 attached through load absorbing springs 28 to the external frame member 32. In this fashion, if it is necessary or desirable to support additional internal mass as might occur should further cyclones (not shown) be used in the center sections of the reactor, their weight could be absorbed and supported through the plenum chamber directly upward through support ring 26 and support springs 28 to the exterior frame.

While a specific embodiment of the invention has been shown and described in detail to illustrate the application of the inventive principles, it will be understood that the invention may be embodied otherwise without departing from such principles.

What is claimed is:

1. An improved support system for internal components of a high temperature vessel such as a catalytic reactor or regenerator comprising a vessel having an outer metallic shell, a gaseous discharge opening in an upper portion thereof, a refractory insulating lining on the interior of said shell, a plurality of cyclones arranged in at least two concentric rings about an upper portion of said vessel, a floating circular plenum separate from and interior of said vessel outer shell fixedly connected to said cyclones to receive gas discharged therefrom, a plurality of short radial brackets affixed to the outer periphery of said plenum, said brackets being located in pairs substantially vertically above the outer periphery of each of the cyclones in the outer ring of cyclones, substantially vertical strap means extending between each of the cyclones in said outer ring and a pair of said brackets thereabove for supporting said cyclones from said brackets, said inner concentric ring of cyclones arranged to receive gaseous discharge from said outer ring of cyclones and being fixedly secured to and supported from an area of said plenum immediately adjacent and radially inward from said brackets, and a plurality of link means pivotally attached at one end in a common horizontal plane to said vessel shell and at their other ends to said brackets in a common horizontal plane, the point of pivotal attachment of each said link to each said bracket being radially positioned to substantially balance the weight radially inward of said point of pivotal attachment against the weight of the cyclones located radially outward of said point of pivotal attachment, whereby bending stresses in said suppport system are minimized and the combined weight of said plenum and cyclones is transmitted to said shell in tension through said pivoted link means.

2. The support system of claim 1 wherein said circular plenum includes an outlet conduit extending upwardly through the gaseous discharge opening exterior of said shell, and auxiliary support means secured to said plenum outlet conduit for supporting a portion of the plenum weight from means exterior of said vessel shell.

3. The support system of claim 2 including bellows seal means between said plenum outlet conduit and said shell.

4. The support system of claim 3 wherein said auxiliary support means includes spring means attached between said plenum outlet conduit and external frame means thereby permitting vertical differential thermal movement of said plenum relative to said frame means.

5. In a high temperature vessel such as a catalytic reactor or regenerator having an outer metallic shell, a gaseous discharge opening in an upper portion thereof, and a refractory insulating lining on the interior of said shell, the improvement comprising; a cyclone and plenum assembly including, a plurality of cyclones arranged in at least two concentric rings about an upper portion of said vessel and a floating circular plenum separate and independent of said vessel outer shell fixedly connected to said cyclones to receive gas discharged therefrom, and a support system for said cyclone and plenum assembly, including, a plurality of short radial brackets affixed to the outer periphery of said plenum, said brackets being substantially vertically above each of the cyclones in the outer ring of cyclones, substantially vertical strap means extending between each of the cyclones in said outer ring and a pair of said brackets thereabove for supporting said cyclones from said brackets, said inner concentric ring of cyclones arranged to receive gaseous discharge from said outer ring of cyclones and being fixedly secured to and supported from an area of said plenum immediately adjacent and radially inward from said brackets, and a plurality of link means pivotally attached at one end to said vessel shell and at their other ends to said brackets, said point of pivotal attachment of each said link to each said bracket being radially positioned to substantially balance the load radially inward of said point of pivotal attachment against the load of the cyclones located radially outward of said point of pivotal attachment, whereby bending stresses in said support system are minimized and the combined load of said plenum and cyclones is transmitted solely to said shell in tension through said pivoted link means.

6. The support system of claim 5 wherein said strap means associated with each of said cyclones in said outer ring includes a pair of flat and flexable first members weldably secured at their lower ends to opposite sides of each cyclone, each said first member further including an attachment plate at its upper end disposed at a right angle to the plane of the first member, said attachment plate being weldably secured to its respective bracket.

7. The support system of claim 5 wherein said circular plenum includes an outlet conduit extending upwardly through the shell gaseous discharge opening terminating exterior of said shell, and auxiliary support means secured to said plenum outlet conduit for supporting a portion of the plenum weight from means exterior of said vessel shell.

8. The support system of claim 7 including bellows seal means between said plenum outlet conduit and said shell.

9. The support system of claim 8 wherein said circular plenum includes a concave bottom surface having an annular concave peripheral ring overlying and disposed vertically above said inner concentric ring of cyclones, each of said cyclones in said inner ring including an exhaust conduit extending upwardly and supported from said concave peripheral ring of said plenum.

10. The support system of claim 8 wherein said auxiliary support means includes spring means attached between said plenum outlet conduit and external frame means thereby permitting vertical differential thermal movement of said plenum relative to said frame means.

11. The support system of claim 10 wherein said circular plenum includes a concave bottom surface having an annular concave peripheral ring overlying and disposed vertically above said inner concentric ring of cyclones, each of said cyclones in said inner ring including an exhaust conduit extending upwardly and supported from said concave peripheral ring of said plenum.

* * * * *